(12) United States Patent
Thomas et al.

(10) Patent No.: US 12,115,941 B2
(45) Date of Patent: Oct. 15, 2024

(54) NESTED SECOND ROW CENTER CONSOLE THAT TRANSLATES FROM THE FIRST ROW CENTER CONSOLE SHAPE

(71) Applicant: Ford Global Technologies, LLC, Dearborn, MI (US)

(72) Inventors: Gregory Paul Thomas, Canton, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 17/833,248

(22) Filed: Jun. 6, 2022

(65) Prior Publication Data

US 2023/0391273 A1 Dec. 7, 2023

(51) Int. Cl.
*B60R 7/04* (2006.01)
(52) U.S. Cl.
CPC ...................... *B60R 7/04* (2013.01)
(58) Field of Classification Search
USPC .............................. 296/37.8, 24.34
See application file for complete search history.

(56) References Cited

U.S. PATENT DOCUMENTS

| | | | |
|---|---|---|---|
| 6,851,736 B1* | 2/2005 | Klopp, III | B60R 7/04 296/208 |
| 6,921,118 B2 | 7/2005 | Clark et al. | |
| 7,401,831 B2 | 7/2008 | Sturt | |
| 7,416,235 B2 | 8/2008 | Rajappa et al. | |
| 7,533,918 B2* | 5/2009 | Spykerman | B60R 7/04 296/37.8 |
| 7,591,498 B2* | 9/2009 | Busha | B60N 3/101 224/281 |
| 8,196,985 B2 | 6/2012 | Penner et al. | |
| 9,156,407 B1* | 10/2015 | Kramer | B60R 7/04 |
| 9,845,055 B2* | 12/2017 | Buza | B60R 7/04 |
| 11,148,601 B2* | 10/2021 | Lee | B60R 7/04 |
| 11,220,221 B2 | 1/2022 | Keller et al. | |
| 2016/0272120 A1* | 9/2016 | Johnston | B60N 3/102 |
| 2017/0057416 A1* | 3/2017 | Yang | B60R 7/04 |

FOREIGN PATENT DOCUMENTS

DE 102016010469 * 3/2019

* cited by examiner

*Primary Examiner* — Joseph D. Pape
(74) *Attorney, Agent, or Firm* — Vichit Chea; Price Heneveld LLP (57) ABSTRACT

A center console for vehicles includes a first row storage unit having a first cover and a movable storage unit that is movable along a guide structure between forward and rearward positions. The movable storage unit includes an upper opening and a second cover. The first and second covers can both be in open positions while the movable storage unit is in the forward position at least partially inside the first row storage unit to provide access to an interior space of the movable storage unit.

20 Claims, 13 Drawing Sheets

NESTED SECOND ROW CENTER CONSOLE THAT TRANSLATES FROM THE FIRST ROW CENTER CONSOLE SHAPE

FIELD OF THE DISCLOSURE

The present disclosure generally relates to a center console storage for motor vehicles, and more particularly to a center console arrangement including a movable storage that can be nested within a first row unit and shifted rearwardly to a position outside the first row unit.

BACKGROUND OF THE DISCLOSURE

Various center console storage units have been developed for motor vehicles. Existing center console arrangements may include a storage unit that can be accessed by shifting a cover to an open position.

SUMMARY OF THE DISCLOSURE

An aspect of the present disclosure is a motor vehicle including a passenger space, a front row of seats including left and right front seats, and a second row of seats behind the first row of seats. The second row of seats includes left and right rear seats. The passenger space includes a center space extending in a fore-aft direction between the left and right front seats and between the left and right rear seats. A guide structure extends in a fore-aft direction along the center space. A center console includes a first row storage unit that is located between the left and right front seats in the center space. The center console further includes a movable storage unit that is movable along the guide structure between a forward position in which the movable storage unit is positioned inside the first row storage unit, and a rearward position in which the movable storage unit is located between the left and right rear seats. The first row storage unit includes a first housing, an interior space in the first housing, and an upper opening and a rear opening. The first row storage unit further includes a first cover that can be moved to an open position to permit user access to the interior space through the upper opening. The rear opening is configured to permit at least a portion of the movable storage unit to pass therethrough when moving between the forward position and the rearward position. The movable storage unit further includes a second housing having an upper opening and a second cover movably mounted to the second housing, whereby the first and second covers can be moved to opened positions while the movable storage unit is positioned inside the movable storage unit, whereby an interior space of the second housing can be accessed through the upper openings of the first and second housings.

Embodiments of the first aspect of the present disclosure can include any one or a combination of the following features:

The front row storage unit may, optionally, include a rear cover that can be moved to an open position to permit movement of the movable storage unit from inside of the first row storage unit rearwardly along the guide structure to the rearward position outside of the first row storage unit.

The first row storage unit may optionally include a storage bin that can be operably attached to the first cover. The storage bin can also be operably detached from the first cover. The storage bin moves with the first cover when the storage bin is operably attached to the first cover, and the storage bin remains stationary as the first cover is moved when the storage bin is operably detached from the first cover.

The storage bin may be positioned in the upper opening of the first housing to substantially close off access to the interior space of the first housing through the upper opening of the first housing when the storage bin is operably detached from the first cover and the first cover is in an open position.

The first housing may include an upwardly-facing surface extending around at least a portion of the upper opening of the first housing. The storage bin may include a base wall and sidewalls that extend upwardly from the base wall to define a bin storage space. The storage bin may further include an outwardly-extending support structure having a lower surface that engages the upwardly-facing surface of the first housing to support the storage bin in the upper opening of the first housing when the storage bin is operably detached from the first cover and the first cover is in an open position.

The outwardly-extending support structure of the storage bin may comprise a substantially continuous flange that extends outwardly from upper edge portions of the sidewalls, whereby the flange covers at least a portion of the upwardly-facing surface of the first housing around the upper opening of the first housing to prevent objects from passing downwardly through the upper opening of the first housing.

The second cover may include a main cover that is pivotably mounted to the second housing, and an access panel that is pivotably mounted to the main cover. The upper opening in the first housing has a dimension that is greater than a dimension of the main cover such that the main cover cannot be pivoted upwardly into the upper opening in the first housing when the movable storage unit is positioned inside the first row storage unit. A dimension of the access panel is less than a dimension of the upper opening in the first housing such that the access panel can be pivoted relative to the main cover upwardly into the upper opening in the first housing when the movable storage unit is located inside the first row storage unit.

The main cover and the access panel may be pivoted upwardly together relative to the second housing when the movable storage unit is in the rearward position.

The motor vehicle may optionally include a powered actuator that can be actuated to move the movable storage unit forwardly and rearwardly along the guide structure.

Another aspect of the present disclosure is a nesting console for motor vehicles. The nesting console includes a guide structure extending in a fore-aft direction. The nesting console further includes a center console with a first row storage unit and a movable storage unit that is movable along the guide structure between a forward position in which the movable storage unit is positioned at least partially inside the first row storage unit, and a rearward position in which the movable storage unit is located completely outside of the first row storage unit. The first row storage unit may include an interior space, an upper opening, and a rear opening. The first row storage unit further includes a first cover that can be moved to an open position to permit user access to the interior space through the upper opening. The movable storage unit includes an upper opening and a movable second cover that closes off the upper opening of the movable storage unit when the second cover is closed. The first cover and the second cover can be moved to open positions while the movable storage unit is positioned inside the first row storage unit with the upper openings of the first and second housings in vertical registry with one another, whereby an interior space of the movable storage unit can be accessed through the upper openings of the first and second housings. At least a portion of the movable storage unit moves through the rear opening of the first row storage unit as the movable storage unit moves between the forward position and the rearward position.

The front row storage unit may include a rear cover that can be moved to an open position to permit movement of the movable storage unit from inside the first row storage unit rearwardly along the guide structure to the rearward position.

The first row storage unit may include a storage bin that can be operably attached to the first cover, and operably detached from the first cover. The storage bin moves with the first cover when the storage bin is operably attached to the first cover. The storage bin remains stationary as the first cover is moved when the storage bin is operably detached from the first cover.

The storage bin can be positioned in the upper opening of the first row storage unit to substantially close off access to the interior space of the first row storage unit through the upper opening of the first row storage unit when the storage bin is operably detached from the first cover and the first cover is in an open position.

The first row storage unit may include a first housing having an upwardly-facing surface extending around at least a portion of the upper opening of the first row storage unit. The storage bin may include a base wall and sidewalls that extend upwardly from the base wall to define a bin storage space. The storage bin may further include an outwardly-extending support structure having a lower surface that engages the upwardly-facing surface of the first housing to support the storage bin in the upper opening of the first housing when the storage bin is operably detached from the first cover and the first cover is in an open position.

The outwardly-extending support structure of the storage bin may comprise a substantially continuous flange that extends outwardly from the upper edge portions of the sidewalls. The flange may cover at least a portion of the upwardly-facing surface of the first housing around the upper opening of the first row storage unit to prevent objects from passing through the upper opening of the first row storage unit.

The second cover may include a main cover that is pivotably mounted to the second housing, and an access panel that is pivotably mounted to the main cover. The upper opening of the first row storage unit may have a dimension that is greater than a dimension of the main cover such that the main cover cannot be pivoted upwardly into the upper opening in the first row storage unit when the movable storage unit is positioned inside the first row storage unit. A dimension of the access panel may be less than a dimension of the upper opening in the first row storage unit such that the access panel can be pivoted relative to the main cover upwardly into the upper opening in the first row storage unit when the movable storage unit is located inside the first row storage unit.

The main cover and the access panel may be configured to be pivoted upwardly together when the movable storage unit is in the rearward position.

The nesting console may include a powered actuator that can be actuated to move the movable storage unit along the guide structure.

Another aspect of the present disclosure is a center console for motor vehicles including a guide extending in a fore-aft direction. The center console further includes a stationary console unit having a movable upper cover. A movable storage unit is configured to move along the guide between a forward position in which the movable storage unit is nested at least partially inside the stationary console unit, and a rearward position in which the movable storage unit is completely outside of the stationary console unit. The movable storage unit includes a movable second cover having a main cover and an access panel that is movably mounted to the main cover. The movable upper cover of the stationary console unit and the access panel can both be opened when the movable storage unit is in the forward position while the main cover remains in a closed position to thereby permit access to an interior space of the movable storage unit. The main cover can be moved to an open position when the movable storage unit is in the rear position to permit access to the interior space of the movable storage unit.

The movable storage unit may be configured to close off a rear opening of the stationary console unit when the movable storage unit is in the forward position.

The stationary console unit may include a movable rear cover that closes off a rear opening of the stationary console unit when the movable storage unit is in the forward position and when the movable storage unit is in the rearward position.

BRIEF DESCRIPTION OF THE DRAWINGS

In the drawings:

FIG. 7A;

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
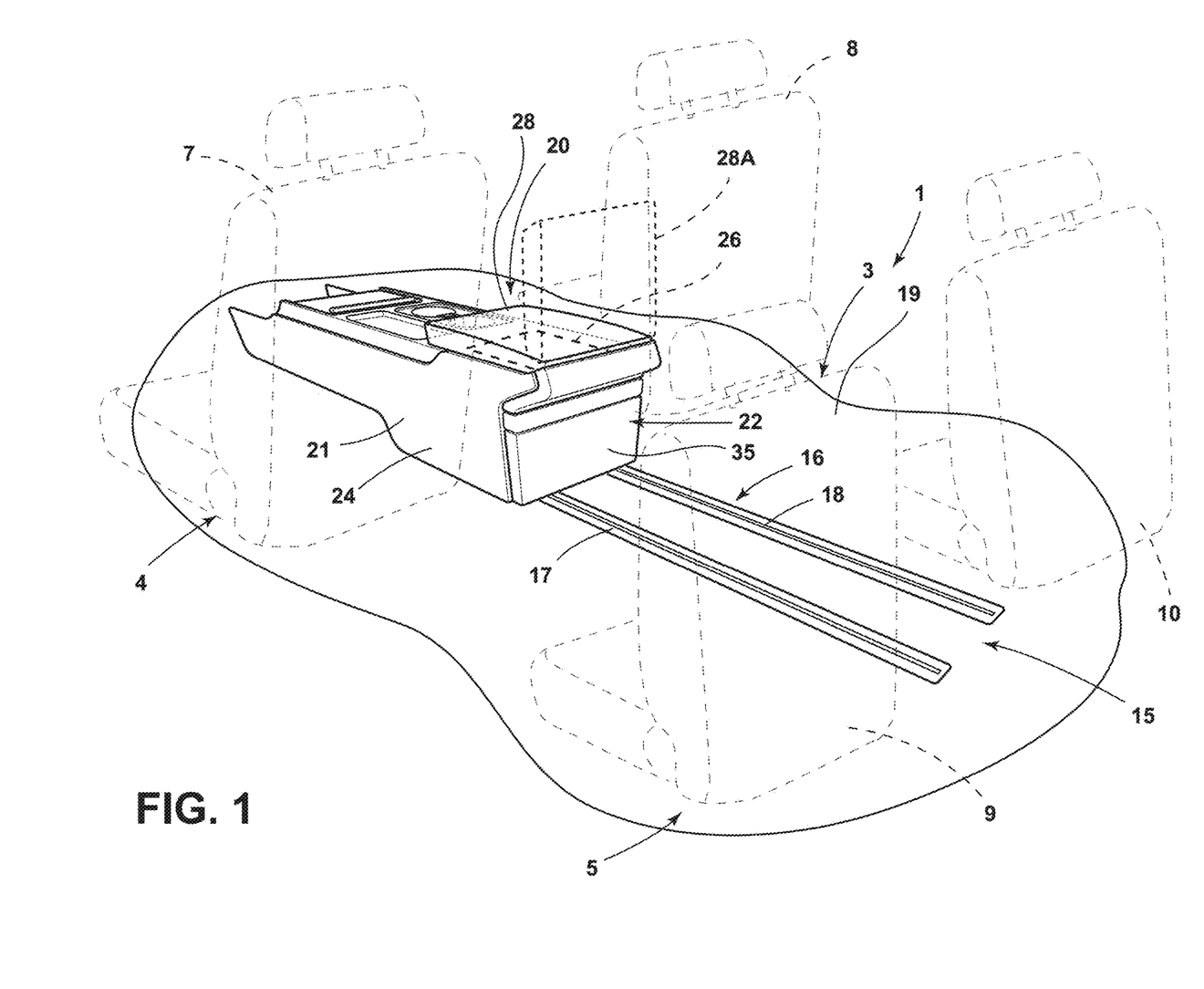
FIG. 1 is a partially fragmentary perspective view of a vehicle interior and nesting center console according to an aspect of the present disclosure showing a first row storage unit and a movable storage unit in a nested location inside the first row storage unit.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
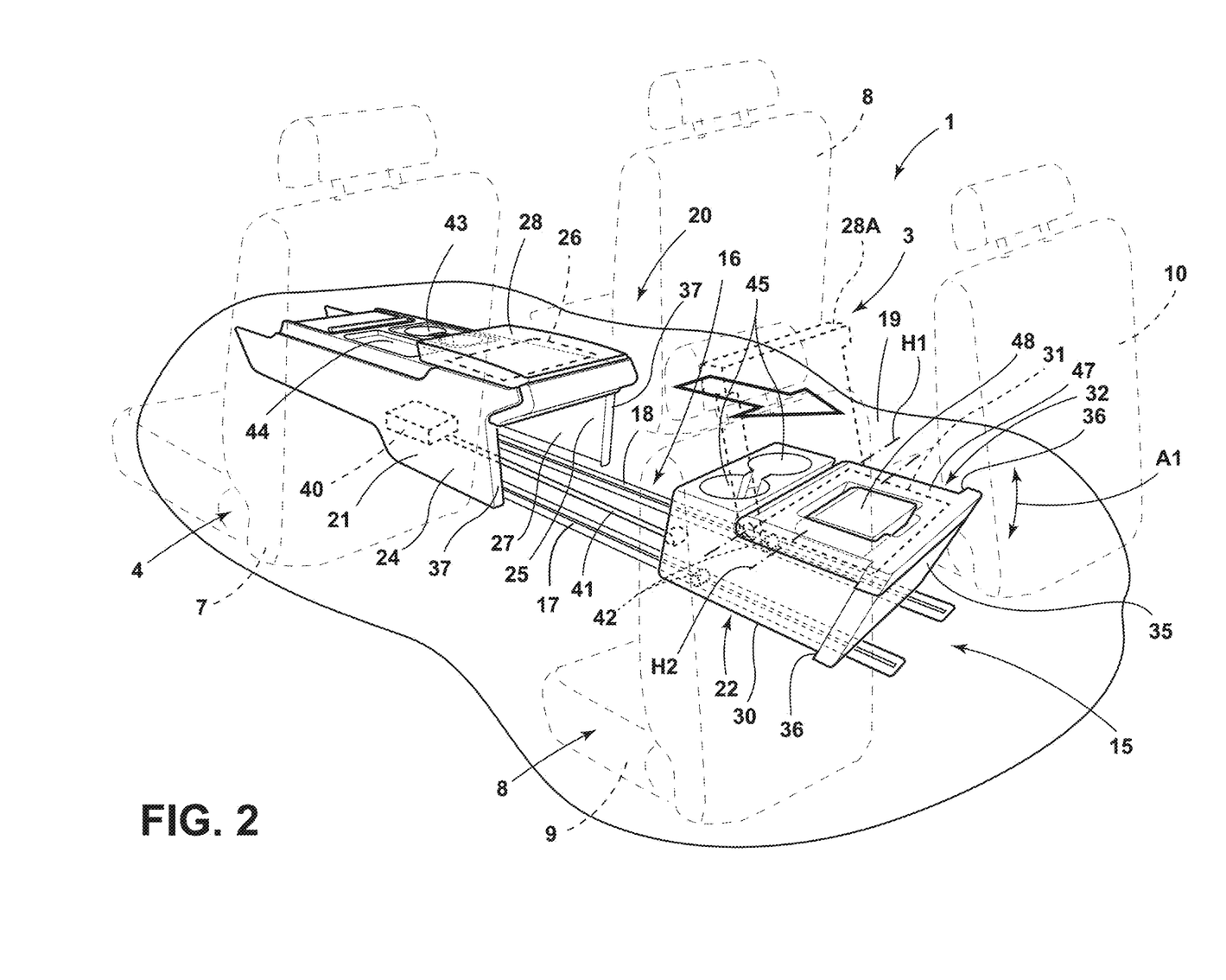
FIG. 2 is a partially fragmentary perspective view of a vehicle interior and nesting center console showing a movable storage unit in a rearward position.
Figure 5:
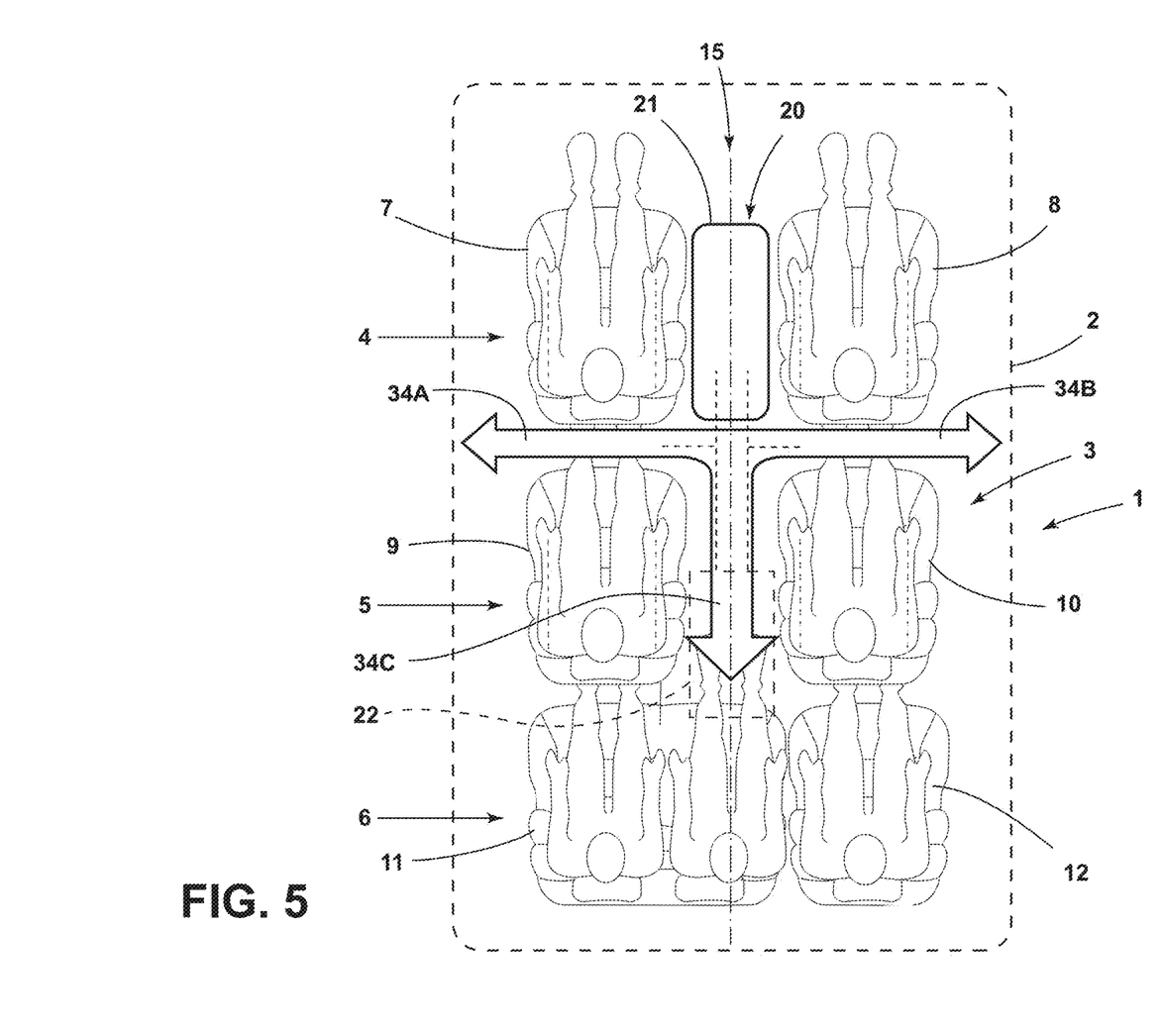
FIG. 5 is a partially schematic plan view of a motor vehicle including a nesting center console.

With reference to FIGS. 1 and 2, a motor vehicle 1 includes a body 2 (see also FIG. 5), and a passenger space 3 that may be formed inside the body 2. As shown in FIG. 5, the motor vehicle 1 may further include a first row of seats 4, a second row of seats 5, and an optional third row of seats 6. The first row of seats 4 includes a left front seat 7 and a right front seat 8. Similarly, the second row 5 includes a left rear seat 9 and a right rear seat 10. As shown in FIG. 5, vehicle 1 may optionally include a left third row seat 11, and a right third row seat 12. The passenger space 3 further includes a center space 15 extending in a fore-aft direction between the left and right front seats 7 and 8, respectively, and between the left and right rear seats 9 and 10, respectively. A guide structure 16 extends in a fore-aft direction along the center space 15. Guide structure 16 may comprise first and second rails 17 and 18 that are disposed on floor 19 of motor vehicle 1.

The motor vehicle further includes a center console 20 (FIG. 1) including a first row storage unit 21 and a movable storage unit 22 (see also FIG. 2). The movable storage unit 22 is movable along the guide structure 16 between a forward position (FIG. 1) in which the movable storage unit 22 is positioned at least partially inside the first row storage unit 21, and a rearward position (e.g. FIG. 2) in which the movable storage unit 22 is located between the left and right rear seats 9 and 10, respectively.

The first row storage unit 21 includes a first housing 24, an interior space 25 (FIG. 2); and a movable first cover 28 that may be moved to an open position 28A (FIG. 1). With reference to FIG. 4A, the first housing 24 may include an upper opening 26 and a rear opening 27. As discussed in more detail below in connection with FIGS. 6 and 7, the first cover 28 can be moved to an open position 28A (FIG. 7) to permit user access to the interior space 25 through the upper opening 26.

Figure 9:
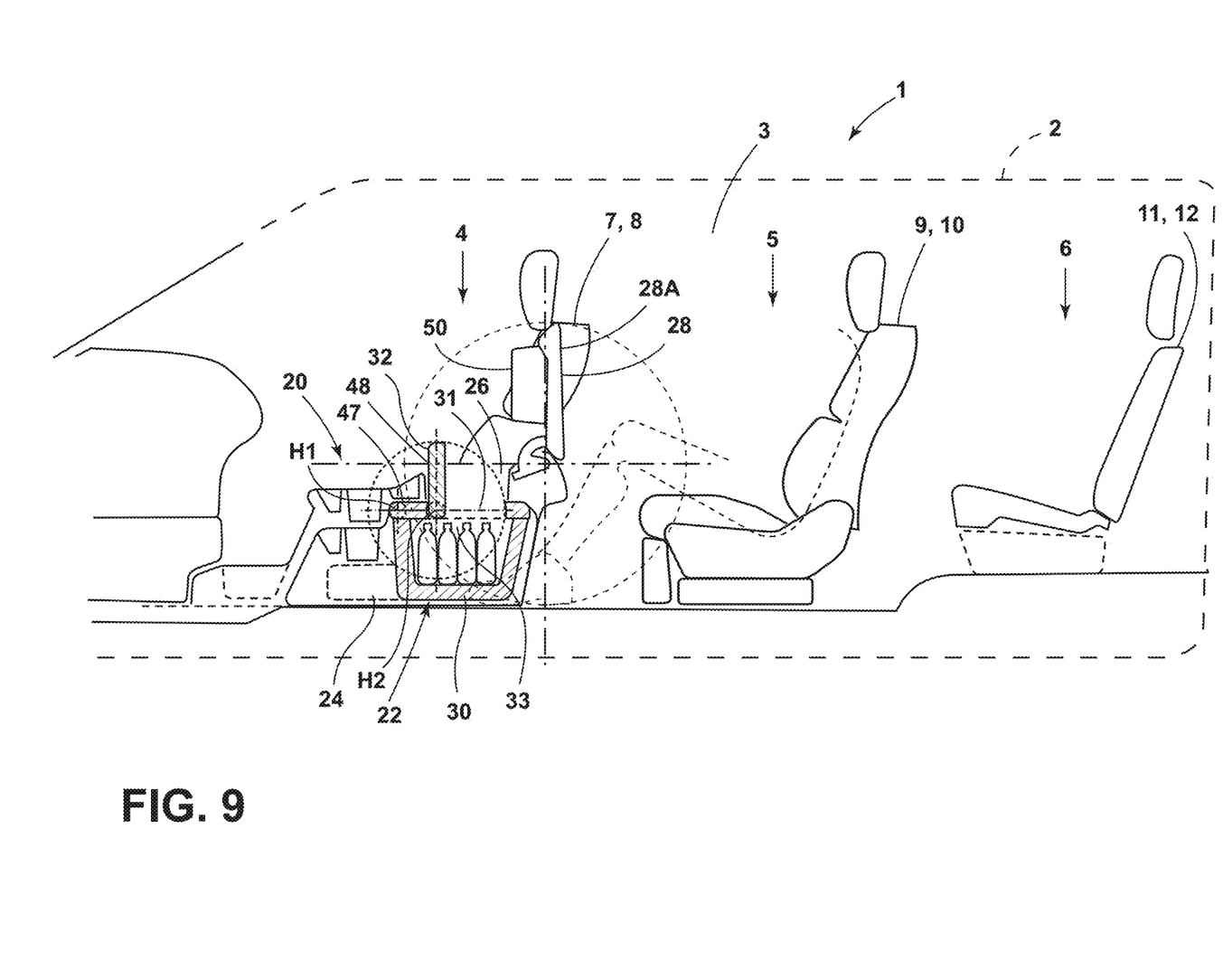
FIG. 9 is a partially fragmentary, schematic side elevational view of a motor vehicle.

The movable storage unit 22 includes a second housing 30 (FIG. 2) having an upper opening 31 (see also FIG. 11) and a second cover 32 that is movably mounted to the second housing 30 for rotation about an axis "H1." Second cover 32 includes a main cover 47 (FIG. 2) and lid or access panel 48 that is movable relative to main cover 47 about an axis "H2." As discussed below in connection with FIG. 9, the first cover 28 can be moved to an open position 28A, and the lid 48 of second cover 32 can be moved to an open position relative to main cover 47 while main cover 47 remains in a closed position, and while the movable storage unit 22 is positioned inside the first row storage unit 21. This permits a user to access an interior space 33 of the second housing 30 through the upper opening 26 of the first housing 24 and through the upper opening 31 of second housing 30.

Referring again to FIGS. 1 and 2, center console 20 may be configured to receive a movable storage unit 22 having a rear panel 35 that is fixed to the movable storage unit 22. When the movable storage unit 22 is shifted to a rearward position as shown in FIG. 2 the rear opening 27 in first housing 24 is exposed. The rear panel 35 may have a finished appearance, and movable storage unit 22 may include edges 36 (FIG. 2) that fit closely against edges 37 of first housing 24 when the movable storage unit 22 is in the nested position (FIG. 1).

Figure 3:
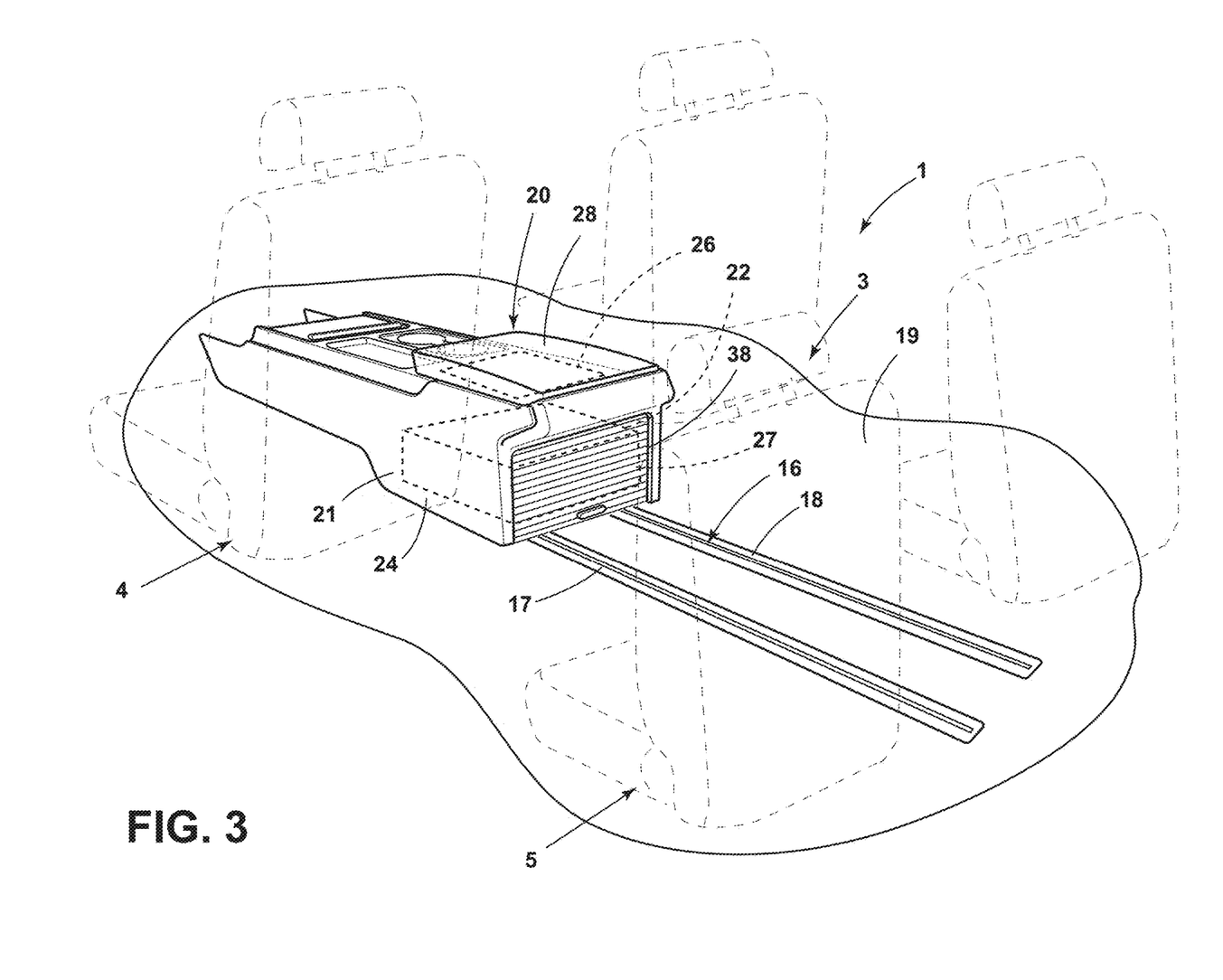
FIG. 3 is a partially fragmentary perspective view of a vehicle interior and nesting center console unit according to another aspect of the present disclosure showing a movable storage unit in a forward, nested location.
Figure 4:
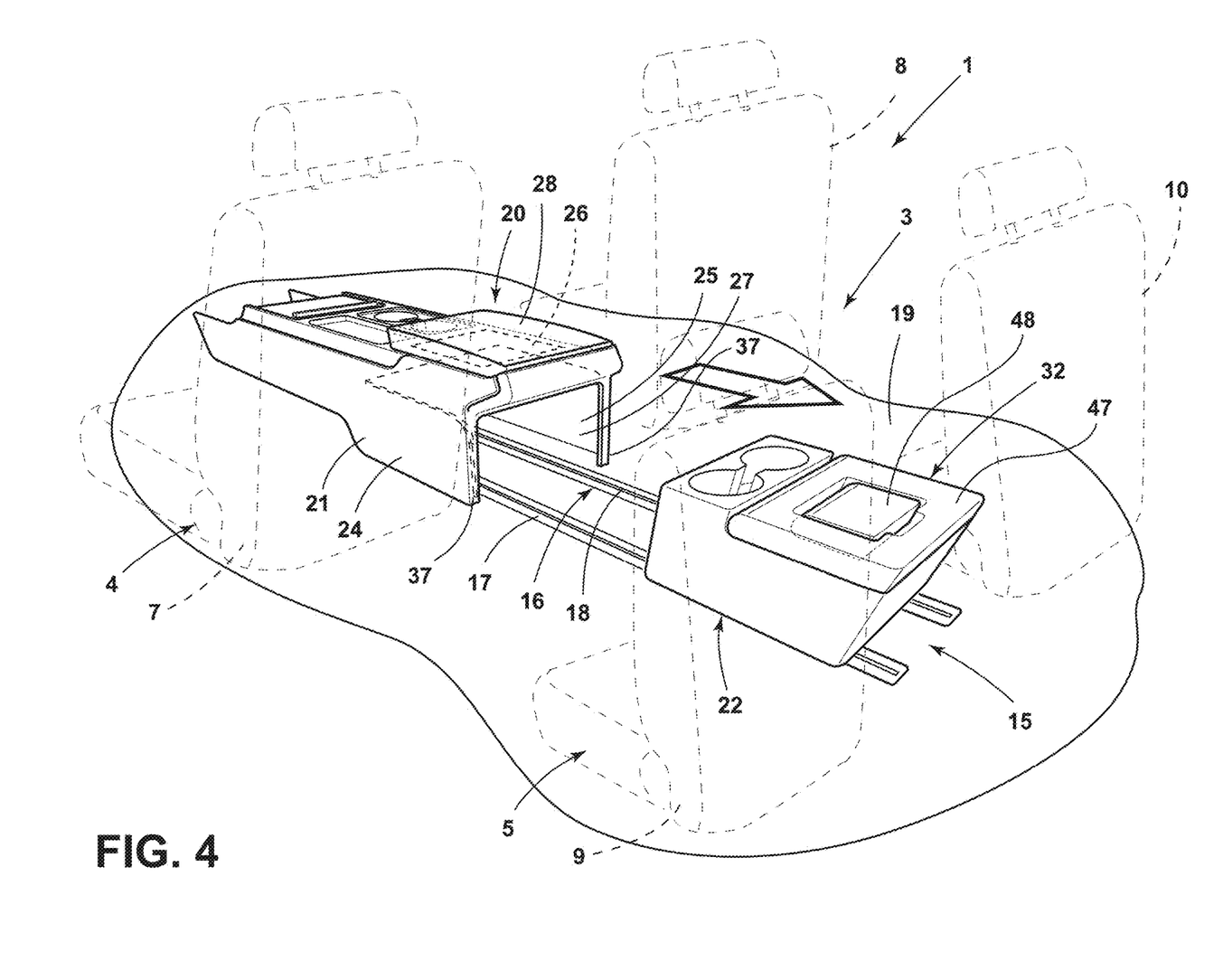
FIG. 4 is a partially fragmentary perspective view of a vehicle interior and nesting center console unit showing a movable storage unit in a rearward position.
Figure 4A:
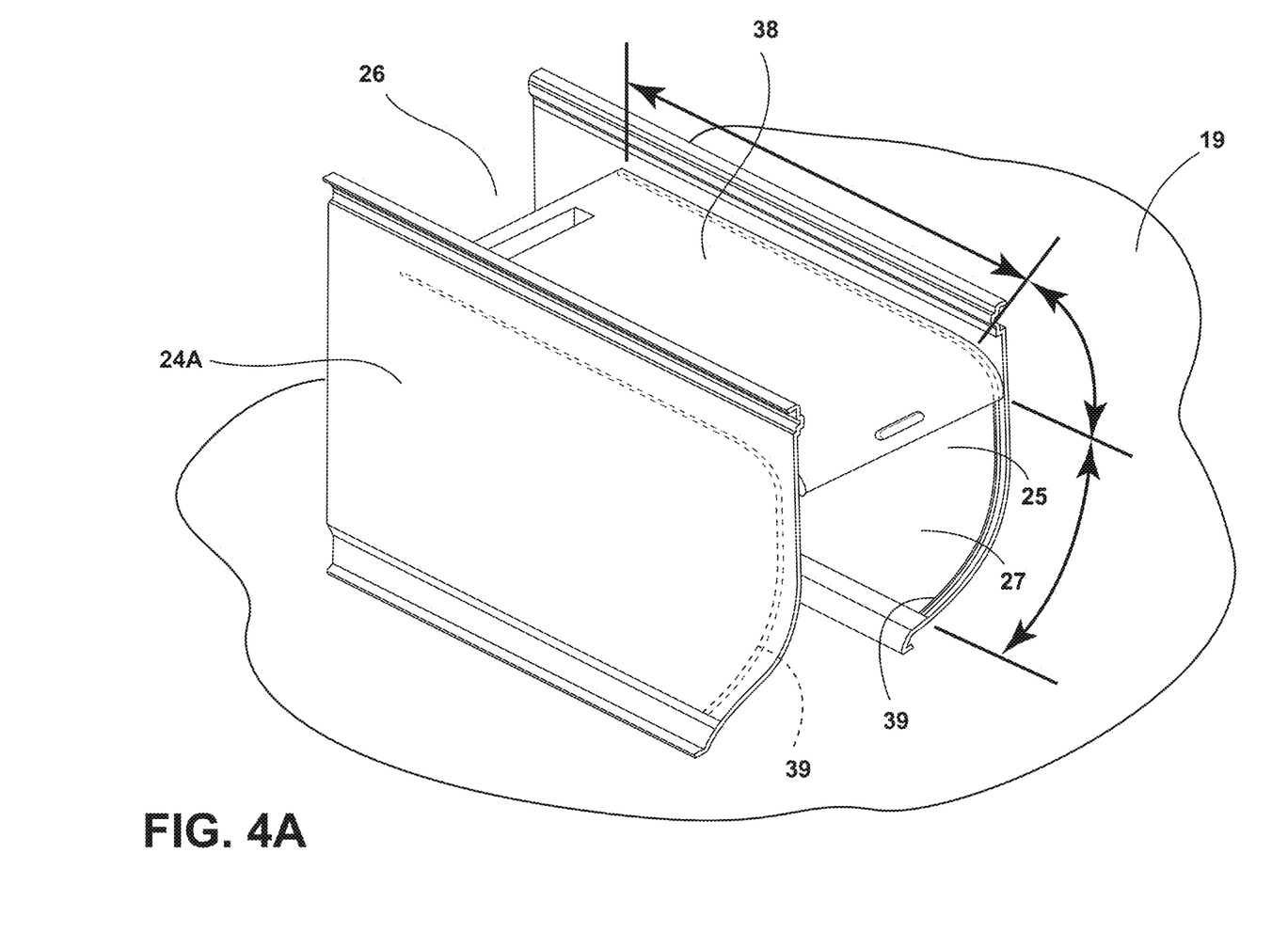
FIG. 4A is a partially fragmentary view of a portion of the center console unit of FIGS. 3 and 4, showing a movable door in an open position.

Alternatively, as shown in FIGS. 3, 4, and 4A, the center console 20 may include a door 38 that is movably mounted to an inner structure 24A of the first housing 24 by guides 39 (FIG. 4A) whereby the door 38 can be shifted from a closed position (FIG. 3) to an open position (FIG. 4). As shown in FIG. 4, movable storage unit 22 does not include surfaces that bear against edge surfaces 37 of first housing 24. Rather, the movable storage unit 22 of FIG. 4 may be configured to fit completely inside interior space 25 of first housing 24 when movable storage unit 22 is in a forward position (FIG. 3), such that door 38 can be shifted to the closed position of FIG. 3 to close off rear opening 27 of first housing 24.

With reference to FIG. 5, pass through zones 34A, 34B, and 34C can be utilized by passengers throughout the vehicle interior when the console is in a nested configuration (e.g. FIGS. 1 and 3).

Referring again to FIG. 2, the vehicle 1 may include a linear powered actuator 40 that is operably connected to the movable storage unit 22 by an elongated connector 41. The linear actuator 40 may comprise an electrically-powered unit that can be actuated to shift the movable storage unit 22 from the nested position (FIG. 1) to a rearward position (FIG. 2) and visa-versa. The elongated connector 41 may comprise a cable and pulleys or other suitable connector. The movable storage unit 22 may include bearings 42 that slidably engage first and second rails 17 and 18 to thereby movably support the movable storage unit 22 on the guide structure 16. It will be understood that virtually any linear powered actuator and guide structure may be utilized to provide powered fore-aft movement of movable storage unit 22.

Referring again to FIG. 2, the first row storage unit 21 may include one or more upwardly-facing cavities 43 and 44 that are configured to receive and support beverage containers, or other items. Similarly, movable storage unit 22 may include cavities 45 that are configured to support beverage containers or the like.

Figure 11:
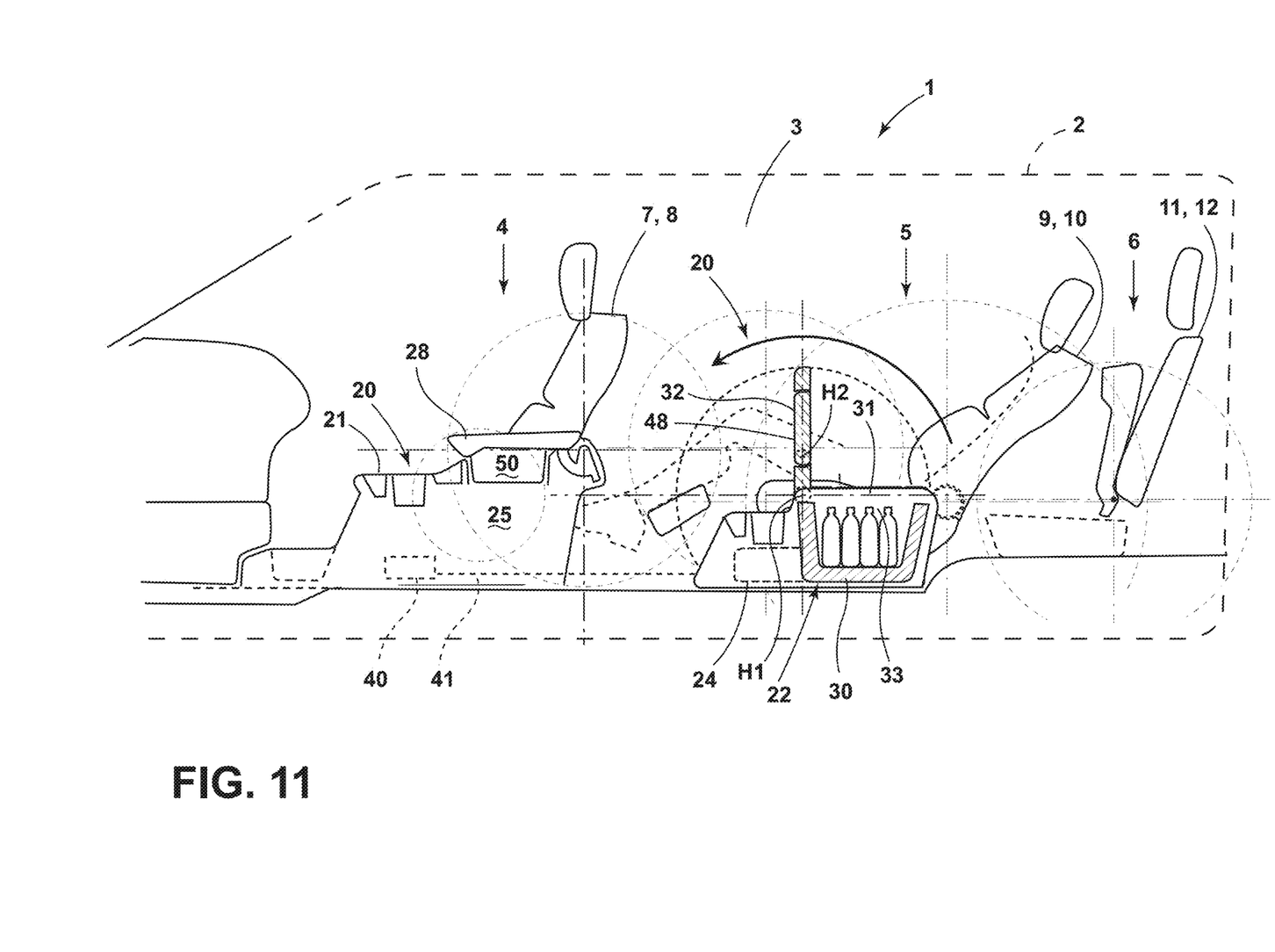
FIG. 11 is a partially fragmentary, schematic side elevational view of a motor vehicle.

Second cover 32 of movable storage unit 22 may be rotatably mounted to second housing 30 for pivotable rotation about a horizontal axes "H1" (FIG. 2) between open and closed positions as shown by the arrow "A1." The second cover 32 may comprise a main cover 47 that is pivotably mounted to the second housing 30, and the second cover 32 may also include an access panel 48 that is pivotably mounted to the main cover 47 for rotation about an axes "H2." As shown in FIG. 11, the second cover 32, including main cover 47 and access panel 48, can be pivoted to an open position to provide access to the interior space 33 of movable storage unit 22 when the movable storage unit 22 is in a rearward position. As shown in FIG. 9, when the movable storage unit 22 is in a forward (nested) position inside the first row storage unit 21, the access panel 48 can be pivoted to an open position while the main cover 47 remains in a closed position to thereby permit access to the interior space 33.

Figure 6:
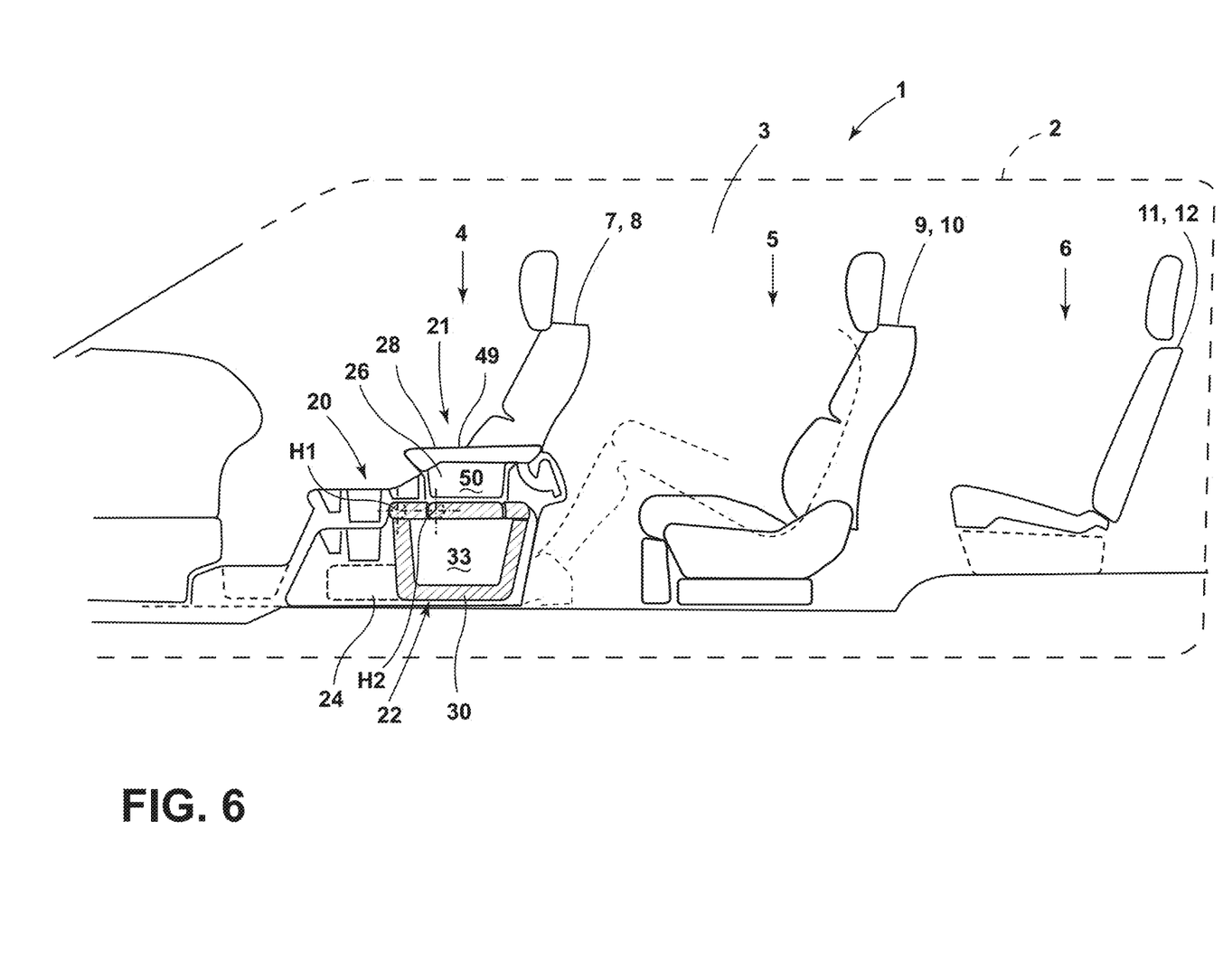
FIG. 6 is a partially fragmentary, schematic side elevational view of the motor vehicle of FIG. 5.
Figure 7:
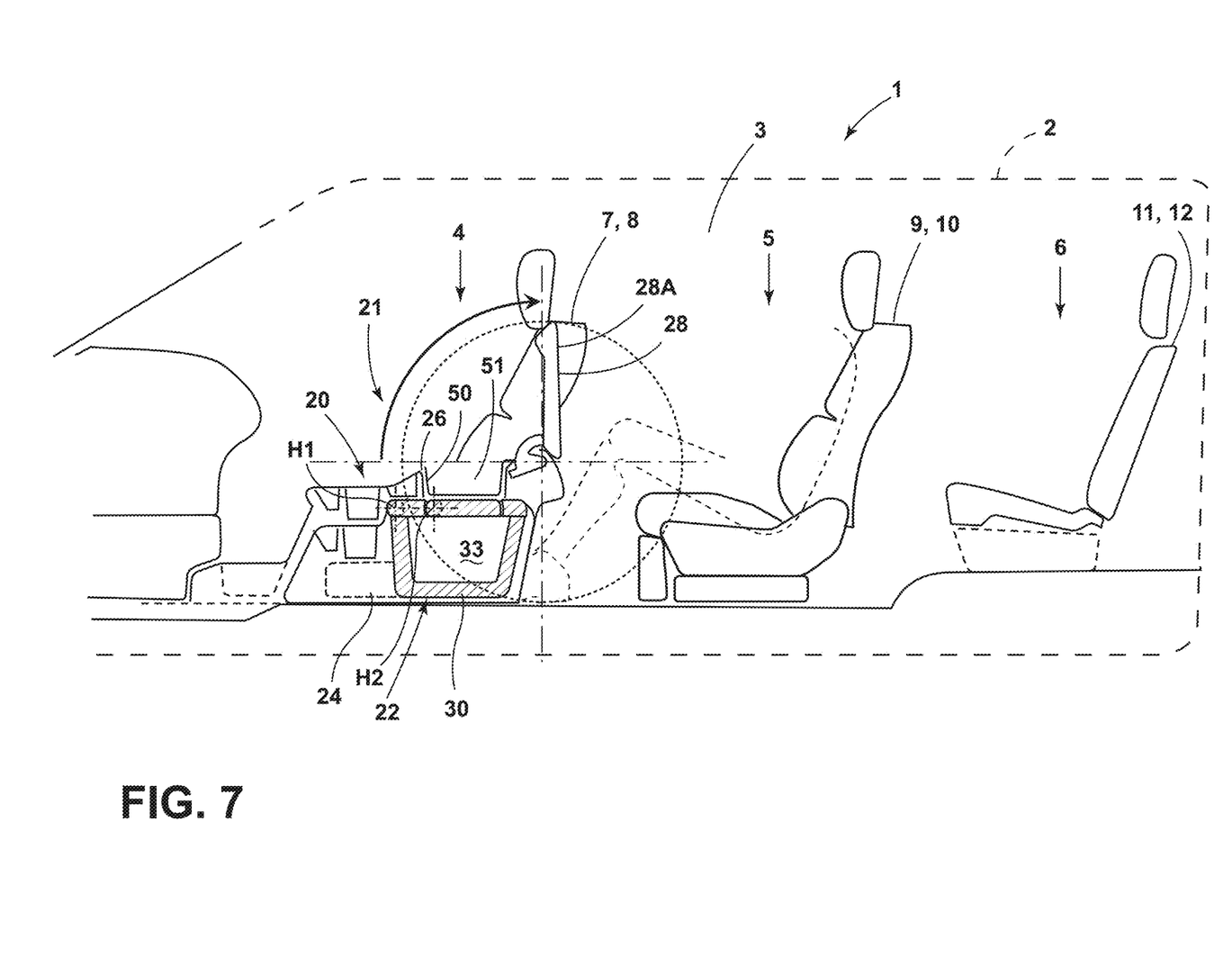
FIG. 7 is a partially fragmentary, schematic side elevational view of a motor vehicle.

When configured as shown in FIG. 6, the movable storage unit 22 may be positioned inside first row storage unit 21, and first cover 28 may be closed to thereby close off access through upper opening 26 of first housing 24. First cover 24 may optionally include a cushioned upper surface 49 for use as an armrest when users are positioned in the front seats 7 and 8. The center console 20 may include a storage bin 50 that may be positioned in upper opening 26 of first housing 24. As shown in FIG. 7, the storage bin 50 may remain in opening 26 as first cover 28 is opened such that a user can access storage space 51 of storage bin 50. The storage bin 50 may be releasably connected to the first cover 28, such that the bin 50 travels upwardly with the first cover 28 as shown in FIG. 8.

Figure 7A:
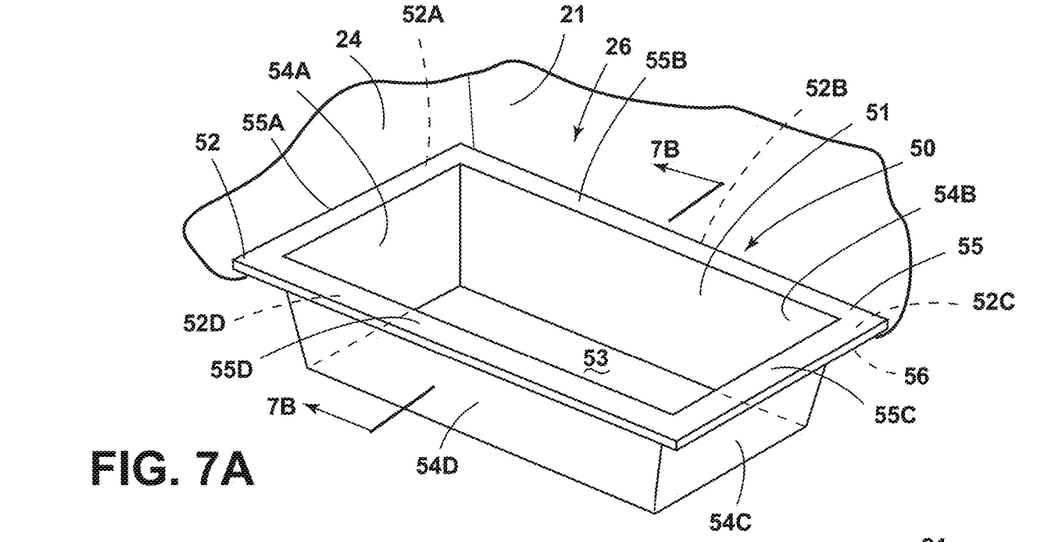
FIG. 7A is a partially fragmentary isometric view of a storage bin according to an aspect of the present disclosure.
Figure 7B:
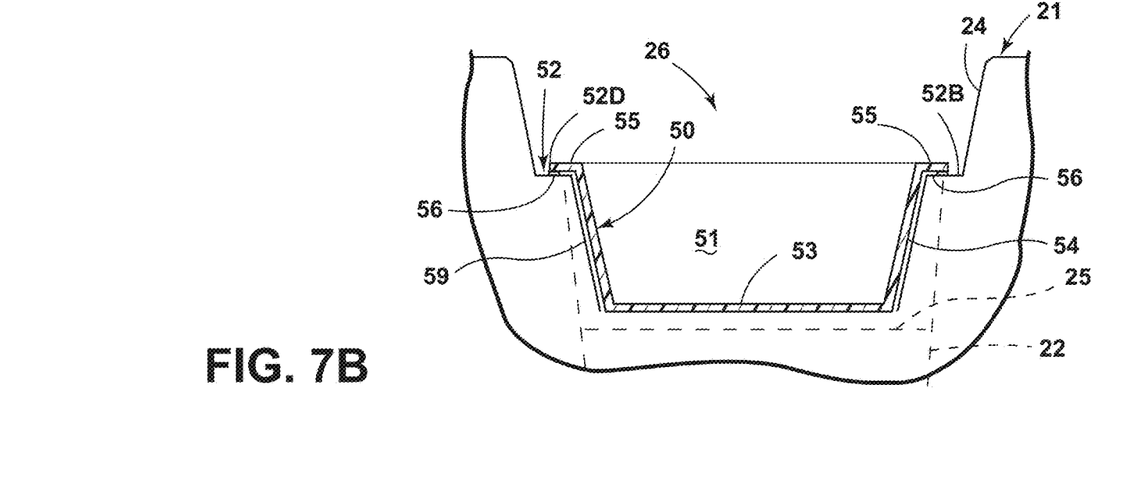
FIG. 7B is a cross sectional view taken along the line 7B-7B.

With further reference to FIGS. 7A and 7B, first housing 24 of first row storage unit 21 may include an upwardly-facing surface 52 that extends around at least a portion of the upper opening 26 of the first housing 24. Storage bin 50 may include a base wall 53 and sidewalls 54 that extend upwardly from the base wall 53 to define bin storage space 51. Storage bin 50 may further include outwardly-extending support structure 50 having a lower surface 56 that engages the upwardly-facing surface 52 of the first housing 24 to support the storage bin 50 in the upper opening 26 of the first housing 24 when storage bin 50 is operably detached from the first cover 28, and the first cover 28 is in an open position. The support structure 55 may be in the form of a substantially continuous flange having four linear portions 55A-55D that project outwardly from sidewalls 54A-54D, respectively. The upwardly-facing surface 52 of first housing 24 may include linear portions 52A-52D that may extend continuously around opening 26 of first housing 24. The overlap of flange 55 over upwardly-facing surface 52 ensures that objects that are being positioned in storage space 51 of storage bin 50 do not inadvertently fall through upper opening 26 into interior space 25 of first housing 24 and/or onto movable storage unit 22 if movable storage unit 22 is positioned inside first row storage unit 21.

Figure 8:
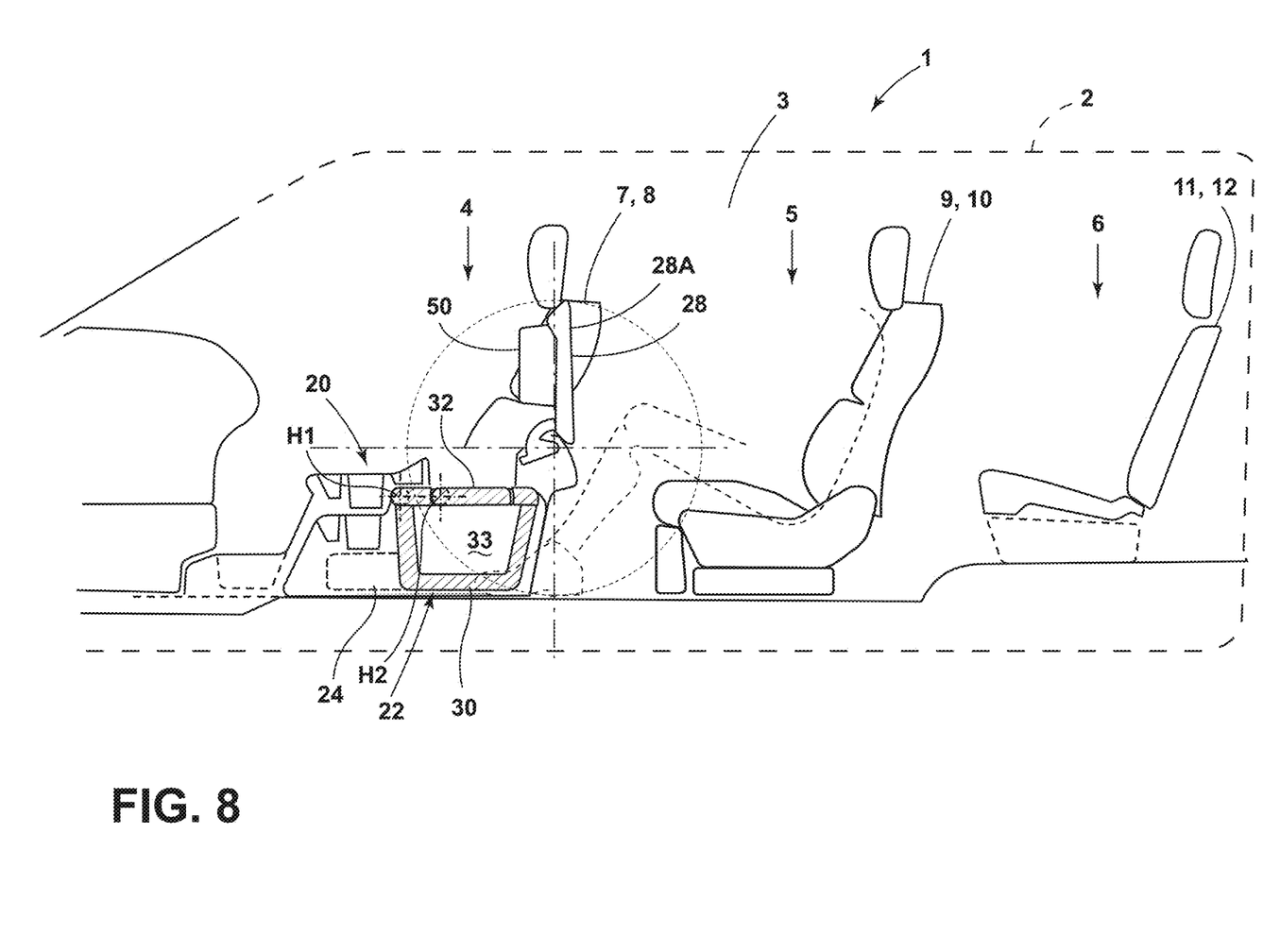
FIG. 8 is a partially fragmentary, schematic side elevational view of a motor vehicle.

With further reference to FIG. 8, storage bin 50 can be operably attached to lid 28 whereby the storage bin 50 moves upwardly with storage bin 28. As shown in FIG. 9, the access panel 48 of second cover 32 of movable storage unit 22 can then be rotated to an open position to permit users in the front row 4 to access the interior space 33 of movable storage unit 22.

Figure 10:
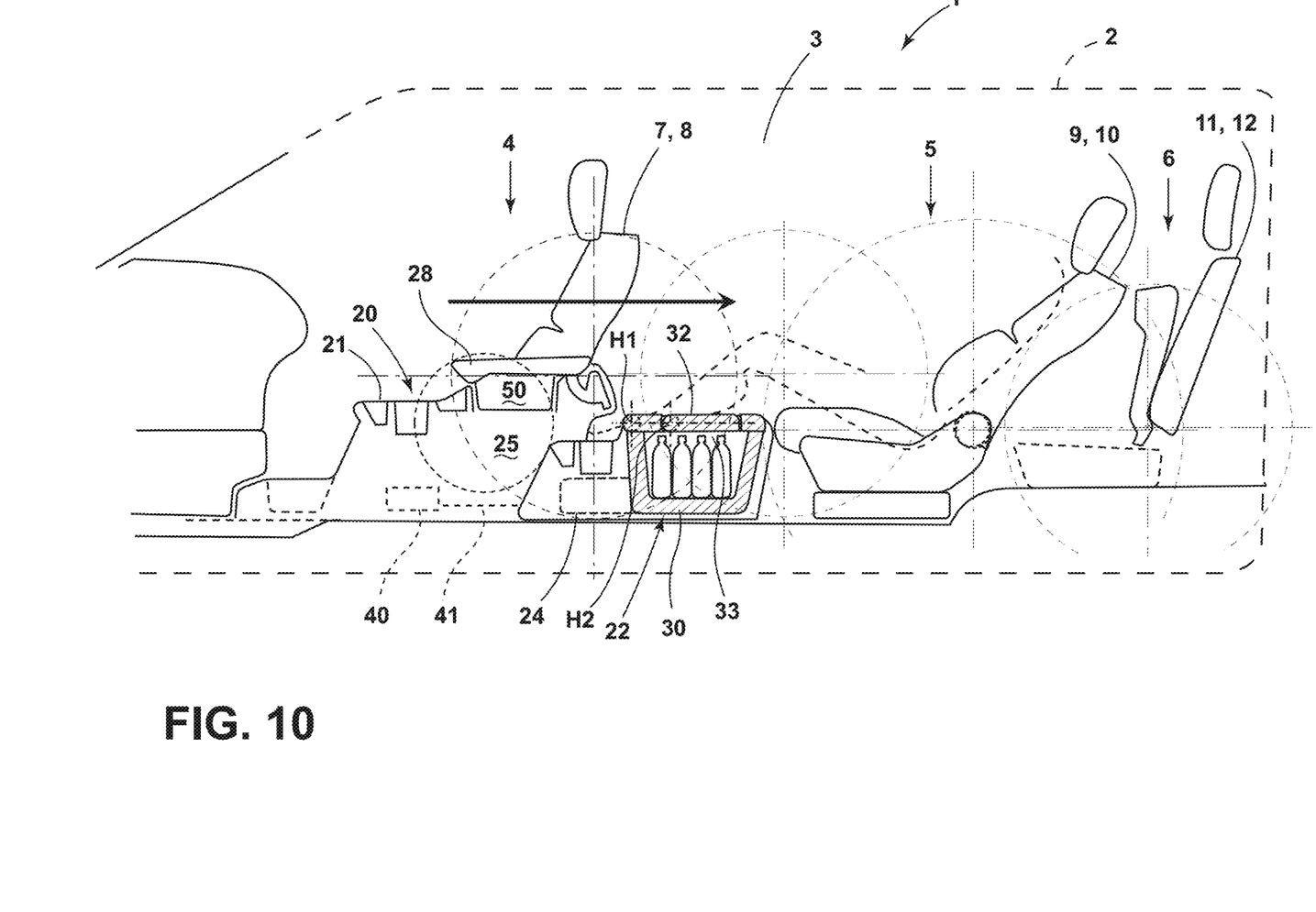
FIG. 10 is a partially fragmentary, schematic side elevational view of a motor vehicle.

With reference to FIG. 10, the linear actuator 40 can be actuated to shift the movable storage unit 22 from the forward position (FIGS. 6-8) towards the rearward position between the seats 9 and 10 of the second row 5. If the center console 20 includes a door 38 (FIGS. 3, 4, and 4A), the door 38 is first shifted to an open position before moving the movable storage unit 22 out of the interior space 25 of first housing 24.

When the movable storage unit 22 is in a rearward position (FIG. 11), the second cover 32, including main cover 47 and access panel 48, can be shifted to an open position to permit user's in second row seats 9 and 10 to access interior space 33 of movable storage unit 22. The movable storage unit 22 may then be shifted forward upon actuation of linear powered actuator 40 to return the movable storage unit 22 to the nested position (e.g. FIG. 6).

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
a front row of seats disposed in a passenger space of the motor vehicle, the front row of seats including left and right front seats;
a second row of seats behind the first row of seats, the second row of seats including left and right rear seats;
wherein the passenger space includes a center space extending in a fore-aft direction between the left and right front seats and between the left and right rear seats;
a guide structure extending in a fore-aft direction along the center space;
a center console including a first row storage unit located in the center space between the left and right front seats and a movable storage unit that is movable along the guide structure between a forward position in which the movable storage unit is positioned inside the first row storage unit, and a rearward position in which: 1) the movable storage unit is located between the left and right rear seats, and, 2) a front side of the moveable storage unit is spaced apart from a rear side of the first row storage unit to form a gap therebetween;
wherein the first row storage unit includes a first housing, an interior space in the first housing, and an upper opening and a rear opening, the first row storage unit further including a first cover that can be moved to an open position to permit user access to the interior space through the upper opening, and wherein the rear opening of the first row storage unit is configured to permit at least a portion of the movable storage unit to pass therethrough when the movable storage unit moves between the forward position and the rearward position;
and wherein the movable storage unit includes a second housing having an upper opening and a second cover movably mounted to the second housing, whereby the first cover and the second cover can be moved to open positions while the movable storage unit is positioned inside the first row storage unit whereby an interior space of the second housing can be accessed through the upper openings of the first and second housings.

2. The motor vehicle of claim 1, wherein:
the front row storage unit includes a rear cover that can be moved to an open position to permit movement of the movable storage unit from inside the first row storage unit rearwardly along the guide structure to the rearward position.

3. The motor vehicle of claim 1, wherein:
the first row storage unit includes a storage bin that can be operably attached to the first cover and operably detached from the first cover, whereby the storage bin: 1) moves with the first cover when the storage bin is operably attached to the first cover; and 2) remains stationary as the first cover is moved when the storage bin is operably detached from the first cover.

4. The motor vehicle of claim 3, wherein:
the storage bin can be positioned in the upper opening of the first housing to substantially close off access to the interior space of the first housing through the upper opening of the first housing when the storage bin is operably detached from the first cover and the first cover is in an open position.

5. The motor vehicle of claim 4, wherein:
the first housing includes an upwardly-facing surface extending around at least a portion of the upper opening of the first housing;
the storage bin includes a base wall and sidewalls that extend upwardly from the base wall to define a bin storage space, the storage bin further including an outwardly-extending support structure having a lower surface that engages the upwardly-facing surface of the first housing to support the storage bin in the upper opening of the first housing when the storage bin is operably detached from the first cover and the first cover is in an open position.

6. The motor vehicle of claim 5, wherein:
the outwardly-extending support structure of the storage bin comprises a substantially continuous flange that extends outwardly from upper edge portions of the sidewalls, whereby the flange covers at least a portion of the upwardly-facing surface of the first housing around the upper opening of the first housing to prevent objects from passing through the upper opening of the first housing.

7. The motor vehicle of claim 1, wherein:
the second cover includes a main cover that is pivotably mounted to the second housing, and an access panel that is pivotably mounted to the main cover;
and wherein the upper opening in the first housing has a dimension that is greater than a dimension of the main cover such that the main cover cannot be pivoted upwardly into the upper opening in the first housing when the movable storage unit is positioned inside the first row storage unit, and wherein a dimension of the access panel is less than a dimension of the upper opening in the first housing such that the access panel can be pivoted relative to the main cover upwardly into the upper opening in the first housing when the movable storage unit is located inside the first row storage unit.

8. The motor vehicle of claim 7, wherein:
the main cover and the access panel can be pivoted upwardly together relative to the second housing when the movable storage unit is in the rearward position.

9. The motor vehicle of claim 1, including:
a powered actuator that can be actuated to move the movable storage unit along the guide structure.

10. A nesting console for motor vehicles, the nesting console comprising:
a guide structure extending in a fore-aft direction;
a center console including a first row storage unit having a rear surface and a movable storage unit having a front surface, wherein the movable storage unit is movable along the guide structure between a forward position in which the movable storage unit is positioned at least partially inside the first row storage unit, and a rearward position in which the movable storage unit is located completely outside of the first row storage unit such that the front surface of the movable storage unit is spaced apart from the rear surface of the first row storage unit to form a gap therebetween;

wherein the first row storage unit includes a first housing having an interior space, an upper opening, and a rear opening, the first row storage unit further including a first cover that can be moved to an open position to permit user access to the interior space through the upper opening, wherein the movable storage unit includes a second housing having an upper opening and a movable second cover that closes off the upper opening of the movable storage unit when the second cover is closed, whereby the first cover and the second cover can be moved to open positions while the movable storage unit is positioned inside the first row storage unit with the upper openings of the first and second housings in vertical registry with one another whereby an interior space of the movable storage unit can be accessed through the upper openings of the first and second housings;

and wherein at least a portion of the movable storage unit moves through the rear opening of the first row storage unit as the movable storage unit moves between the forward position and the rearward position.

11. The nesting console of claim 10, wherein:
the front row storage unit includes a rear cover that can be moved to an open position to permit movement of the movable storage unit from inside the first row storage unit rearwardly along the guide structure to the rearward position.

12. The nesting console of claim 10, wherein:
the first row storage unit includes a storage bin that can be operably attached to the first cover and operably detached from the first cover, whereby the storage bin: 1) moves with the first cover when the storage bin is operably attached to the first cover; and 2) remains stationary as the first cover is moved when the storage bin is operably detached from the first cover.

13. The nesting console of claim 12, wherein:
the storage bin can be positioned in the upper opening of the first row storage unit to substantially close off access to the interior space of the first row storage unit through the upper opening of the first row storage unit when the storage bin is operably detached from the first cover and the first cover is in an open position.

14. The nesting console of claim 13, wherein:
the first row storage unit includes a first housing having an upwardly-facing surface extending around at least a portion of the upper opening of the first row storage unit;
the storage bin includes a base wall and sidewalls that extend upwardly from the base wall to define a bin storage space, the storage bin further including an outwardly-extending support structure having a lower surface that engages the upwardly-facing surface of the first housing to support the storage bin in the upper opening of the first housing when the storage bin is operably detached from the first cover and the first cover is in an open position.

15. The nesting console of claim 14, wherein:
the outwardly-extending support structure of the storage bin comprises a substantially continuous flange that extends outwardly from upper edge portions of the sidewalls, whereby the flange covers at least a portion of the upwardly-facing surface of the first housing around the upper opening of the first row storage unit to prevent objects from passing through the upper opening of the first row storage unit.

16. The nesting console of claim 10, wherein:
the second cover includes a main cover that is pivotably mounted to the second housing, and an access panel that is pivotably mounted to the main cover;
and wherein the upper opening in the first row storage unit has a dimension that is greater than a dimension of the main cover such that the main cover cannot be pivoted upwardly into the upper opening in the first row storage unit when the movable storage unit is positioned inside the first row storage unit, and wherein a dimension of the access panel is less than a dimension of the upper opening in the first row storage unit such that the access panel can be pivoted relative to the main cover upwardly into the upper opening in the first row storage unit when the movable storage unit is located inside the first row storage unit.

17. The nest console of claim 16, wherein:
the main cover and the access panel can be pivoted upwardly together when the movable storage unit is in the rearward position.

18. A center console for motor vehicles, comprising:
a guide extending in a fore-aft direction;
a stationary console unit having a movable upper cover;
a movable storage unit that is configured to move along the guide between a forward position in which the movable storage unit is nested at least partially inside the stationary console unit, and a rearward position in which the movable storage unit is completely outside of the stationary console unit;
wherein the movable storage unit includes a movable second cover having a main cover and an access panel that is movably mounted to the main cover, whereby the movable upper cover of the stationary console unit and the access panel can both be opened when the movable storage unit is in the forward position while the main cover remains in a closed position to permit access to an interior space of the movable storage unit, and whereby the main cover can be moved to an open position when the movable storage unit is in the rearward position to permit access to the interior space of the movable storage unit.

19. The center console of claim 18, wherein:
the movable storage unit closes off a rear opening of the stationary console unit when the movable storage unit is in the forward position.

20. The center console of claim 18, wherein:
the stationary console unit includes a movable rear cover that closes off a rear opening of the stationary console unit when the movable storage unit is in the forward position and when the movable storage unit is in the rearward position.

* * * * *